A. G. DAY.
CLEANING INDIA RUBBER.
No. 15,067.             Patented June 10, 1856.
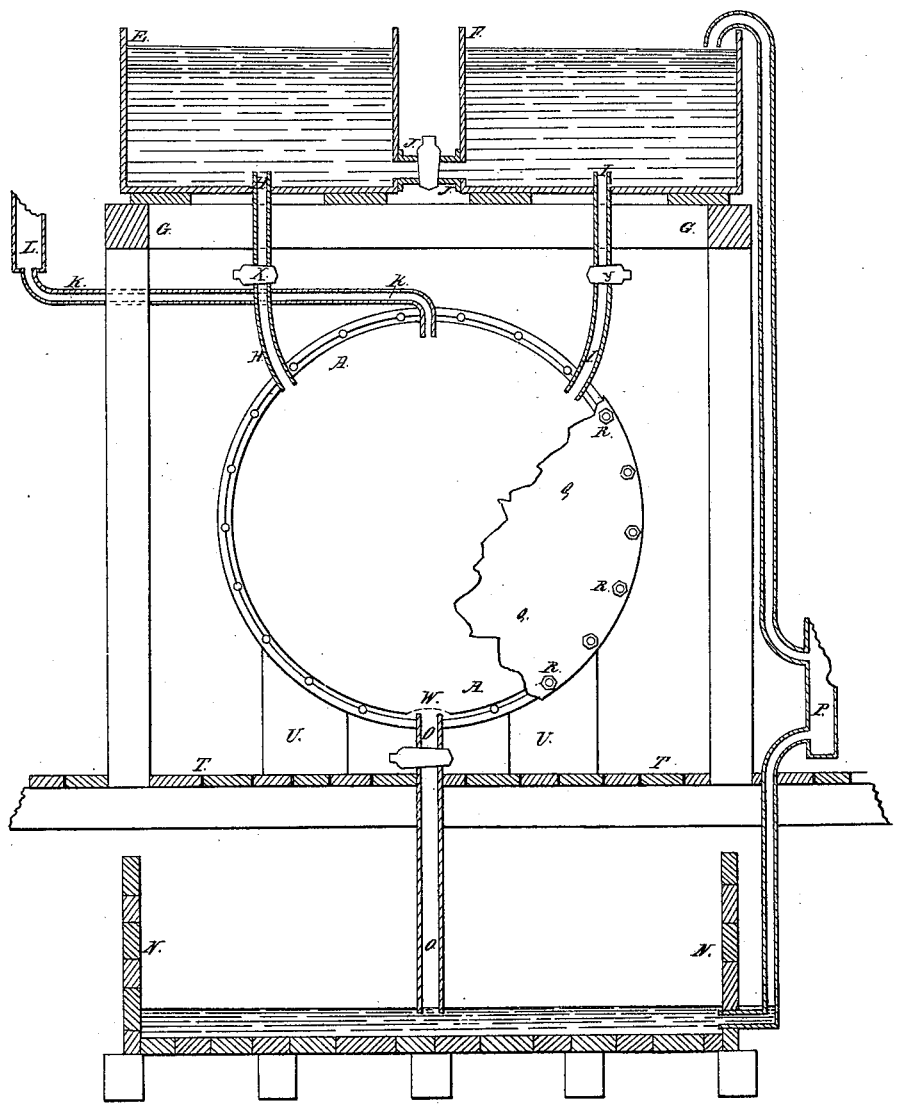

UNITED STATES PATENT OFFICE.

AUSTIN G. DAY, OF SEYMOUR, CONNECTICUT.

CLEANING INDIA-RUBBER.

Specification forming part of Letters Patent No. 15,067, dated June 10, 1856; Reissued July 12, 1859, No. 756.

*To all whom it may concern:*

Be it known that I, AUSTIN G. DAY, of Seymour, in the State of Connecticut, have invented a new and Improved Mode of Cleaning India-Rubber and other Gums; and I do hereby declare that the following is a full and exact description thereof, reference being had to the accompanying drawing and to the letters of reference marked thereon.

It is well known to the manufacturers of india rubber goods that there is great difficulty in vulcanizing or curing articles that are made from the inferior qualities of this substance. This arises to a great extent from the imperfect cleaning and preparation of the rubber previous to the mixing process, or incorporation of the sulfur with the rubber. The crude gum and especially those varieties that are imported from Java and Africa contain a very large proportion of foreign matters, as wood, bark, sand, and earths; the spaces around these substances and the minute cavites which exist throughout the mass are filled with gases which are generated or formed by the fermentation and decomposition of the earthy and vegetable substances.

Caoutchouc is to some extent soluble in hydrogen and certain other gases; for this reason it is very important that all impurities that can generate these gases, and also the gas itself should be entirely removed from the rubber in the first process of the manufacture in order to prevent the injury that arises from this cause, during the subjection of the goods to the heat of the vulcanizing process. To effect this I proceed as follows: The rubebr in its crude state is first cut or torn by suitable machinery into small pieces and washed in water by which means the largest and heaviest of the foreign matters are removed; the water is allowed to drain from the cut rubber, and it is then placed in an air tight cylinder or boiler, as shown in the drawing, making a part of this specification and marked A. The cylinder A, is made of boiler iron of suitable size to contain the quantity of rubber or other gum that is to be operated upon, and of such strength as to bear with safety the pressure to which it is subjected when the air is exhausted. It is supported in a horizontal position upon the floor T of the work-room, from which it is raised about one foot by the blocks U; from the bottom of the cylinder, a drain-pipe O, having a strainer at W, leads through the floor T, to the vat or cistern N. Above the cylinder, and supported upon the platform G there are two cisterns E and F connected with each other by the horizontal pipe J; from these cisterns the pipes H and I, lead into the cylinder A. An air pump L, of suitable size is connected with the top of the cylinder A by the pipe K. In the vat or cistern N, placed below the floor as previously mentioned, there is a pump P, from which a supply pipe leads to the upper cisterns E and F.

In the vat N, I place a solution of caustic soda or potash or other solution of greater specific gravity than water, which is then pumped into the vats E and F, the stop-cocks X and Y being closed. The rubber is now put into the cylinder A in quantities of from one to two tons according to the size of the apparatus; the movable head Q of the cylinder is put in its place and firmly secured by the keys and joint-bolts R. The air pump L is then put in operation and a partial vacuum produced in the cylinder, thus exhausting the air from the interstices of the rubber and at the same time removing the noxious gases. The stop-cocks X and Y are now opened and the caustic alkali or other solution flows through the pipes H and I into the cylinder A and falling upon the rubber enters its cavities and fills all the interstices;—the wood, bark and other foreign matters are also filled with the solution and are thus rendered of greater specific gravity than they are, in their natural condition, while at the same time they are loosened and partially detached from the rubber.

I allow the rubber to remain in the solution until the woody and porous substances are fully impregnated with the solution; the time required for this part of the process depends in a great degree upon the quality of the gum and the quantity of foreign substances contained in it. The liquor is now drawn from the cylinder A,—through the pipe O, into the cistern N; the rubber is then removed from the cylinder and thrown into vats containing water which is so stirred or agitated as to allow the particles of cut rubber and foreign matter to be detached from each other. As soon as this occurs the greater specific gravity acquired by the porous substances while subjected to the action of the solution causes them to sink to the bottom of the vat, while the rubber is left floating upon the surface of the water. The gases and other foreign matters being thus thoroughly removed from the rubber, it is, after being well washed and dried, ready for immediate use or for market.

I claim—

The exhaustion of the noxious gases from the crude india rubber and its subsequent treatment for the purpose of cleansing and purifying it, as herein set forth.

AUSTIN G. DAY. [L. S.]

In presence of—
  E. A. STANSBURY,
  J. M. BATCHELDER.

[FIRST PRINTED 1912.]